United States Patent [19]

Timsit et al.

[11] Patent Number: 5,232,788
[45] Date of Patent: Aug. 3, 1993

[54] ALUMINUM BRAZING SHEET

[75] Inventors: Roland S. Timsit; Benjamin J. Janeway, both of Kingston, Canada

[73] Assignee: Alcan International Limited, Montreal, Canada

[21] Appl. No.: 835,203

[22] Filed: Feb. 12, 1992

[51] Int. Cl.$^5$ .............................................. B32B 15/02
[52] U.S. Cl. ................................... 428/560; 428/551; 428/555; 428/654
[58] Field of Search ............... 428/654, 546, 551, 552, 428/555, 560

[56] References Cited

U.S. PATENT DOCUMENTS

| | | | |
|---|---|---|---|
| 3,951,328 | 4/1976 | Wallace et al. | 228/207 |
| 4,240,574 | 12/1980 | Schmatz et al. | 228/217 |
| 4,357,397 | 11/1982 | Baba et al. | 428/654 |
| 4,475,960 | 10/1984 | Yamawaki et al. | 148/26 |
| 4,556,165 | 12/1985 | Yamawaki et al. | 228/223 |
| 4,619,716 | 10/1986 | Suzuki et al. | 148/26 |
| 4,649,087 | 3/1987 | Scott et al. | 428/654 |
| 4,705,206 | 11/1987 | Kamiya et al. | 228/183 |
| 4,962,880 | 10/1990 | Iwai et al. | 228/183 |
| 5,041,343 | 8/1991 | Fortin et al. | 428/654 |

FOREIGN PATENT DOCUMENTS

| | | |
|---|---|---|
| 0326337 | 2/1989 | European Pat. Off. |
| 0327245 | 9/1989 | European Pat. Off. |

Primary Examiner—Donald P. Walsh
Assistant Examiner—Ngoclan T. Mai
Attorney, Agent, or Firm—Cooper & Dunham

[57] ABSTRACT

An aluminum alloy composite sheet is described for use in brazing. It includes an aluminum alloy core sheet clad on at least one face thereof with a sheet of aluminum or aluminum alloys including those containing magnesium. The composite sheet is useful for brazing when the cladding is coated with a mixture of (i) metal particles, e.g. silicon, capable of forming a eutectic alloy with aluminum and (ii) brazing flux, e.g. a potassium fluoroaluminate. To be effective for brazing, the magnesium must be present in such quantity that at the time of brazing, the surface being brazed contains less than 0.1% by weight magnesium.

15 Claims, No Drawings

ALUMINUM BRAZING SHEET

BACKGROUND OF THE INVENTION

This invention relates to a novel aluminum brazing sheet and a brazing method utilizing such sheet.

It is common practice to join aluminum components by disposing an aluminum brazing alloy between or adjacent the component surfaces to be joined, and heating the brazing alloy and the joining surfaces in appropriately assembled fashion to a temperature (brazing temperature) at which the brazing alloy melts while the components remain unmelted. Upon subsequent cooling, the brazing alloy forms a filet or joint that bonds the joining surfaces of the components. For assured selective melting of only the brazing alloy in the heating step, it is commonly preferred that the melting point of the brazing alloy be at least 30 to 40° C. lower than that of the metal of the components. An example of a typical aluminum brazing alloy is an aluminum-silicon eutectic composition, which starts to melt at about 577° C.

A brazing sheet is commonly prepared by cladding a core aluminum alloy sheet on one of both faces with a sheet of the aluminum brazing alloy. The core alloy is typically an aluminum alloy containing magnesium, e.g. AA 6951, X800, etc. but strong alloys such as AA 6061 are preferred. The typical brazing alloy for the cladding contains about 7.5 to 15% silicon, and usually contains about 12% silicon. This high silicon alloy is relatively expensive to produce and scrap recovery procedures are difficult and expensive.

It is the object of the present invention to produce a brazing sheet which is less expensive to produce and much easier to recover as scrap than is traditional brazing sheet. Another object of the invention is to make a strong brazing sheet using AA6061 as the core material.

SUMMARY OF THE INVENTION

According to the present invention it has now been discovered that a highly useful brazing sheet can be produced in which the cladding comprises any aluminum or aluminum alloy, such as commercial purity aluminum, unalloyed aluminum, or any aluminum alloy, including aluminum alloys containing magnesium.

In order to carry out brazing with the above sheet, the cladding is first coated with a mixture of a brazing flux material and of metal particles, such as Si, Cu, Ge or Zn, capable of forming in situ a eutectic alloy with aluminum. It has been found that this coating is capable of supplying both the metal required for forming a eutectic composition in situ during the brazing procedure and the flux required for the brazing.

The aluminum for the cladding may be either aluminum of any purity, or aluminum alloys including those containing magnesium. To be effective for brazing, the magnesium must be present in such quantity that at the point of brazing at the time of brazing, the magnesium content is less than 0.1% by weight. In other words, the metal present at the physical point of filler metal generation resulting from the reaction of the metal particles capable of forming a eutectic alloy with the metal of the cladding at the time of the brazing has a magnesium content of less than 0.1% by weight. The cladding alloys include those resistant to corrosion through sacrificial action such as the Al-Zn and Al-Cu alloys and may include various alloying concentrations of other elements which do not affect their characteristics. The Al-Zn alloy typically contains about 1% by weight of Zn with the other components being present only at impurity levels which do not affect the characteristics of the alloy. However, commercial purity, unalloyed aluminum is preferred because it is inexpensive, and the costs for reclaiming the material scrapped during the manufacturing process and recycling are minimal.

The aluminum alloy core is usually one containing magnesium, e.g. AA 6951, etc., but strong aluminum alloys such as AA 6061 are preferred. Other particularly useful core alloys are those of the X800 type described in European patent publications EP0326 337 published 02/08/89 and EP0327 245 published 09/08/89.

The selection of the core alloy depends on the properties desired in the fabricated workpiece. For example, when high mechanical strength is desired, the core alloys are of the AA7000, 2000, or 6000 type which contain one or more of Cu, Fe, Mg, Mn, Si and/or Zn. For corrosion resistance, the core alloys are chosen from the AA 6000, 5000 or 3000 types, which contain one or more of Mg, Mn, Cr, or V. To obtain good age hardening characteristics, the alloys of choice are of the AA 6000 type, containing Cu, Mg, Si or Zn. For ease of forming the fabricated parts, the choice is usually made from the AA 3000 and 5000 types. To obtain good impact and wear resistance, the core alloys containing one or more of Cu, Mg, Ni, and/or Si are chosen. Readily machinable workpieces are made from core alloys containing Mg, Ni, Sn, Zn, Pb, Bi or Sb.

The flux component of the coating mixture may be any material capable of removing oxide layer and which melts in the range 450° C. to 600° C., and higher if the metal for forming the eutectic has a higher melting point. As herein used, potassium fluoroaluminate refers to materials containing the elements potassium, aluminium, and fluorine, in such proportions that compounds such as $KF$, $AlF_3$, $KAlF_4$, $K_2AlF_5$, $K_3AlF_6$ either singly, doubly or in combination are present. The composition can be expressed in terms of the elemental composition of 20 to 45% K; 10 to 25% Al, and 45 to 60% F; or in terms of the concentration of the compounds $KF$ and $AlF_3$, as 40 to 70% $AlF_3$ and 30 to 70% $KF$. Such fluxes have been described among others in U.K. Patent 1,055,914 for a combination containing 53–55% $AlF_3$ and 45–47% $KF$; and in U.S. Pat. No. 3,951,328 for a combination of 45–65% $AlF_3$ and 35 to 55% $KF$, which provides for a mixture of $K_3AlF_6$ and $KAlF_4$ to give a mixtures which melts around 560° C. Other potassium fluoroaluminates having the desired flux properties are mixtures of 65.6 to 99.9% $KAlF_4$ and 34.4 to 0.1% $K_3AlF_6$. Yet another is described in European patent publication EP 0295541 for a mixture prepared from 31.5 to 56.2% $KF$ and 68.5 to 43.8% $AlF_3$. Still another is described in U.S. Pat. No. 4,579,605, this being for a flux comprising one member chosen from the group $K_2AlF_5$ and $K_2AlF_5.H_2O$, the remainder being $KF$. A commercially sold potassium fluoroaluminate is known as Nocolok ®. Other suitable potassium fluoroaluminates are $KAlF_4$, $K_2AlF_5$, $K_3AlF_6$ and their mixtures; and potassium fluoroaluminate mixed with one or more of cesium chloride, rubidium chloride, lithium fluoride, cesium fluoride and other alkali halide salts to reduce the melting point of the flux. Other known aluminum brazing fluxes are: mixtures of alkali and alkaline earth chlorides and fluorides, ammonium chloride, ammonium fluoride, potassium acid fluoride ($KHF_2$), sodium acid fluoride ($NaHF_2$), ammonium acid fluoride (NH₄HF₂), zinc chloride, mixtures of zinc chloride, potassium acid fluoride and ammonium chloride and potassium fluoro-zirconate ($K_2ZrF_6$).

The particle size of the eutectic forming metal powder is typically less than 1000 μm, preferably in the range 4 to 80 μm, more preferably in the range 5 to 50 μm. Silicon is a preferred metal for forming the eutectic alloy, but zinc, copper and germanium also give satisfactory results. The metal and flux are preferably used in a metal:flux ratio in the range 0.1:1 to 5:1, with the ratio in the range 1:1 to 1:3 being particularly preferred.

The coating mixture may be modified by the inclusion of other metals, of the same particle size distribution as the eutectic alloy forming metal. These other metals are selected to yield, in reaction with specially-designed aluminum alloys, joined parts with better properties. For example, the addition of copper powder to the coating mixture already containing silicon powder and brazing flux will lead to sufficient Cu diffusion into the joints, and more generally throughout the core alloy of the joined structure during brazing, to enhance the mechanical strength of the parent alloys. The parent alloy could be a common aluminum alloy or an alloy designed to become heat-treatable after reacting with the diffused copper. Similarly, additions of Fe, Mn, Ni, excess Si, and Zn powders to the coating mixture already containing silicon powder and brazing flux, either separately or in combination with each other, can generate superior mechanical strength, superior elevated temperature strength and/or superior heat treatability of the joined aluminum parts. Additions of elements such as Cu, Zn, Ni, Co and Mn to the coating mixture can yield superior formability properties to the brazed aluminum parts. Additions of Bi and Sr enhance the wettability properties of the eutectic liquid to the parent alloy during brazing and may also modify solid constituents in the solidified joints and/or in the core alloys after brazing. Additions of Mn and excess Si may yield superior extrudability of the brazed components. All the superior properties described above would be achieved by diffusion of brazing-mixture additives into the brazed components and their subsequent reaction with elements or precipitates in the core alloys. Diffusion may be accomplished either during brazing or by an appropriate heat treatment following brazing.

Other improved properties may be achieved in the brazed assembly by the addition of selected powders to the coating mixture. Additions of Ni, Sn, Zn, Pb, Bi and Sb powder may improve the machinability of the brazed components. The corrosion resistance of the brazed components can be enhanced by additions of Mn, Cr, Sb and V powder. Additions of Zn may yield superior finish following an anodizing treatment.

Superior finish following anodizing may also be achieved by adding an appropriate modifier such as Be or Sr to the brazing flux that would react with the core-alloy surface to minimize the dimensions of solid constituent particles. The weldability of the brazed assembly may be enhanced by additions of Be and excess Si to the coating mixture. The superior properties described above would be achieved by diffusion either during brazing or during an appropriate thermal treatment following brazing. The aluminum parts may be prepared either from conventional aluminum alloys or from alloys designed specifically to promote the property-enhancement sought during heat-treatment.

The components of the coating may be applied as a slurry in water or organic liquid as the vehicle, and then allowed to dry, whereupon an adherent coating is produced. Alternatively, the components of the coating may be applied as a paste, made up by adding a binder component to the mixture. This binder may be selected from a variety of binder materials which are capable of volatilizing below the melting point of the flux and the eutectic alloy that is formed during the brazing. Examples of suitable binder materials include a mixture poly ethylmethacrylate and butylacrylate or 1-(2- methoxy-1-methyloxy)-2-propanol and propylene glycol as the carrier, or 2-methyl-2,4-pentanediol, but other organic and inorganic binders may also be used with good results.

The coating is preferably applied as a slurry and this may be formed with a volatile liquid carrier or it may be formed with deionized water which is evaporated by drying to form a dry coating over the cladding of the brazing sheet. The coating is preferably applied in an amount of 10 to 130 g/², expressed as weight of the dried components.

For the purposes of the present invention, the clad layer is typically about 10% of the total composite sheet thickness and the clad layer preferably has a thickness of at least .025 mm to obtain a good generation of filler metal.

The amount of magnesium present during brazing is quite critical for obtaining a high quality brazing joint. To be effective, the magnesium must be present in such quantity that at the point of brazing at the time of brazing the magnesium content is less than 0.1% by weight. This can conveniently be done by using a cladding which contains less than 0.1% by weight of magnesium. However, because of dilution effects by the eutectic alloy forming metal particles, additional metal particles, etc., it is possible for the cladding to begin with a high magnesium content provided that the magnesium is less than 0.1% at the point of brazing at the time of brazing.

DESCRIPTION OF THE PREFERRED EMBODIMENTS

The following examples are offered for purposes of illustration only, and are intended neither to define nor limit the invention in any manner.

EXAMPLE 1

Clad core composites were prepared from commercially available sheets using AA-6061 aluminum alloy as the core and AA-1050 unalloyed aluminum or AA-7072 aluminum alloy as the cladding. The composite was heated to between 450-500.C, hot rolled to 3.8 mm and then cold rolled to 1, 0.76, 0.50, 0.25, 0.2 and 0.1 mm respectively. Each clad was 10% of the total composite thickness and test coupons 25×75 mm were cut from the composite sheets formed.

The compositions of the above core and clad materials are shown in Table 1 below:

TABLE 1

| Alloy | Composition Wt % | | | | | | | | |
|---|---|---|---|---|---|---|---|---|---|
| | Cu | Fe | Mg | Mn | Si | Zn | Ti | Cr | V |
| AA-1050 (Clad) | .005 | .23 | .005 | .002 | .095 | .007 | .005 | .001 | .016 |

TABLE 1-continued

| Alloy | Composition Wt % | | | | | | | | |
|---|---|---|---|---|---|---|---|---|---|
| | Cu | Fe | Mg | Mn | Si | Zn | Ti | Cr | V |
| AA-6061 (Core) | .25 | .22 | .88 | .001 | .61 | .002 | .012 | .15 | .007 |
| AA-7072 (Clad) | <.01 | .21 | <.001 | <.001 | .09 | 1.01 | .015 | — | — |

Test coupon Size was 25×75 mm.

The test coupons were pretreated by caustic etching for 5 seconds in 5% w/w, 65° C. NaOH solution, water rinsed, desmutted in 50% HNO₃, water rinsed and air dried.

Next, a brazing coating was applied consisting of a 50% total solids slurry of silicon powder and flux in deionized water with a silicon:flux ratio of 1:3. A silicon powder of 20 μm median particle size and NOCOLOK ® KC 100 flux, a potassium fluoroaluminate flux, were used to prepare the slurries.

The slurry was applied at a total loading ranging between 46 and 74 g/m² by dipping, providing a silicon loading ranging from 11 to 18 g/m² and a flux loading ranging from 35 to 56 g/m². The coated coupons were brazed vertically in a brazing furnace using a rapid heat-up to 605.C and soaked at 605° C. for 6 minutes, resulting in a total braze time of about 15 minutes.

The coupons were visually examined and the filler weight was measured. This was done by cutting the coupons exactly in half and weighing the bottom one half. That weight was subtracted from the original weight of the coupon divided by 2. The difference is the weight of the filler metal that had migrated to the bottom of the coupon. The results are shown in Table 2 below:

TABLE 2

| Core Alloy | Clad Alloy | Clad Thickness mm | Si Loading g/m² | Post Brazing Appearance | Weight of Filler Metal | |
|---|---|---|---|---|---|---|
| | | | | | g | % Theoretical |
| AA6061 0.88% Mg | AA1050 .005% Mg | 0.01 | 13.6 | No Flow | | |
| | | 0.02 | 14.2 | No Flow | | |
| | | 0.03 | 15.5 | No Flow | | |
| | | 0.05 | 11.5 | Reacted* | .0122 | 10.8 |
| | | 0.08 | 13.8 | Reacted* | .0442 | 33.3 |
| | | 0.10 | 18.4 | Reacted* | .0671 | 37.5 |

*Filler metal formed and flowed

In the last column of the Table, "Theoretical" refers to the situation in which all of the available eutectic alloy, derived from the silicon in the coating, has flowed and travelled to the bottom of the vertical coupon.

The % Theoretical is calculated as follows: Actual weight of the eutectic alloy made from the deposited Si, which had flowed to the bottom of the strip/Weight of the eutectic alloy that can be formed by all the Si deposited on the surface reacting with the material in the clad layer.

The maximum theoretical value obtained from AA4045/AA3003 brazing sheet is approximately 50% (see Table 7).

EXAMPLE 2

The procedure of Example 1 was repeated using AA 6061 sheet as the core alloy and AA 7072 sheet as the clad alloy. For the brazing coating, the same silicon powder and flux were used with a silicon:flux ratio of about 1:3, providing a silicon loading ranging from 11 to 15 g/m² and a flux loading ranging from 34 to 45 g/m². The results obtained are shown in Table 3 below.

TABLE 3

| Core Alloy | Clad Alloy | Clad Thickness mm | Si Loading g/m² | Post Brazing Appearance | Weight of Filler Metal | |
|---|---|---|---|---|---|---|
| | | | | | g | % Theoretical |
| AA6061 0.88% Mg | AA7072 <0.001% Mg 1.01% Zn | .01 | 13 | No Flow | | |
| | | .02 | 12.5 | No Flow | | |
| | | .03 | 11.4 | No Flow | | |
| | | .08 | 11.7 | Reacted* | .0186 | 16.5 |
| | | .10 | 14.9 | Reacted* | .0230 | 15.8 |

*Filler metal formed and flowed

EXAMPLE 3

Again using the procedure of Example 1, composite sheets were prepared using X800 aluminum alloy sheet for the core and AA 1070 sheet for the clad layer. For the brazing coating, the same silicon powder and flux were again used in a silicon:flux ratio of about 1:3, providing a silicon loading ranging from 10 to 13 g/m² and a flux loading ranging from 31 to 40 g/m². The results obtained are shown in Table 4 below:

TABLE 4

| Core Alloy | Clad Alloy | Clad Thickness mm | Post Brazing Appearance |
|---|---|---|---|
| X800 0.3% Mg | AA1070 | .05 | Reacted* |
| X800 0.3% Mg | AA1070 | .15 | Reacted* |

*Filler metal formed and flowed

EXAMPLE 4

This test was conducted to learn the effects of different silicon particle sizes in the brazing coating. The same procedure as in Example 1 was again followed with sheet composites being prepared from AA 6061 for the core and AA 1050 for the cladding. The clad layer had a thickness of 0.1 mm. For the brazing coating, the same flux was used, while the silicon was used at three different median particle sizes. The silicon powder and flux were in a silicon:flux ratio of about 1:3 and variable loadings were used. The silicon particle sizes and loading used and the results obtained are shown in Table 5 below:

TABLE 5

| Si Median Size μm | Coating Wt. g/m² | Appearance | | Weight of Filler Metal | |
|---|---|---|---|---|---|
| | | Reaction | Surface | g | % Theoretical |
| 85 | 25.9 | Complete | Rough | | |
| | 43.2 | Complete | Rough | | |
| | 63.0 | Complete | Rough | .0209 | 13.1 |
| 20 | 27.5 | Complete | Smooth | .0404 | 60.9 |
| | 35.9 | Complete | Smooth | | |
| | 73.7 | Complete | Smooth | .0671 | 37.5 |
| 10 | 20.4 | Complete | Smooth | .0037 | 7.4 |
| | 32.5 | Complete | Smooth | | |

TABLE 5-continued

| Si Median Size μm | Coating Wt. g/m² | Appearance Reaction | Appearance Surface | Weight of Filler Metal g | Weight of Filler Metal % Theoretical |
|---|---|---|---|---|---|
| | 41.0 | Complete | Smooth | .0648 | 65.1 |

From the above results, it can be seen that the 85 μm particles are too coarse, and the filler generated does not flow readily. The use of 10 or 20 μm particles gives satisfactory results.

EXAMPLE 5

The procedure of Example 4 was repeated, using X 800 aluminum alloy for the core and AA 1070 for the clad laer. For the brazing coating, the same flux was used and silicon with median particle size of 20 μm and 10 μm were used, with variable loadings. The results obtained are shown in Table 6 below:

TABLE 6

| Si Size mμ | Weight Coating g/m² | Soak Time Mins. | Filler Wt. % of Theoretical | RESULTS Filler Flow | RESULTS Residual Si |
|---|---|---|---|---|---|
| 20 | 53.5 | 8.8 | | Excellent | Moderate |
| 20 | 28.2 | 11.3 | 60 | Excellent | Small |
| 20 | 33.4 | 11.3 | 68 | Excellent | Small |
| 10 | 22.5 | 11.3 | 65 | Excellent | Small |
| 10 | 27.6 | 11.3 | 54 | Excellent | Very Little |
| 10 | 32.8 | 11.3 | 63 | Excellent | Small |

From the above results, it can be seen that excellent filler metal generation and flow were obtained at a total coating loading ranging from 53.5 g/m² with 20 μm silicon particle size. Some unreacted silicon remained on the surface. Similar results were obtained with 10 μm silicon and a total coating loading ranging from 22.5 to 27.6 g/m².

EXAMPLE 6

This test was conducted to determine whether a corrosion resistant band of dense precipitate is formed when X 800 aluminum alloy is used as the core. For this test, the clad layer was AA 1070 aluminum alloy. The core sheet had a thickness of 0.4 mm and the clad had a thickness of 0.04 mm. After brazing, the coupons were examined in longitudinal and transverse cross sections. It was confirmed that the dense band was present.

EXAMPLE 7

The test was run to convert all or almost all of the clad to filler metal based on the theoretical amounts of Si required for this conversion. Composite sheets were prepared using AA6061 as the core alloy and AA1050 as the clad alloy with cladding thicknesses as outlined in Example 1. Various slurries were used to produce Si coating weights as shown in Table 7.

A NOCOLOK ® flux coated AA4045/3003 braze sheet coupon was run concurrently as a reference.

It can be seen that an AA1050 clad alloy thickness of 0.08 mm or greater on AA6061 core yields a quantity of filler metal equivalent to that produced with 0.05 mm thick AA4045 clad on AA3003 core.

TABLE 7

| Core Alloy | Clad Alloy | Clad Thickness (mm) | Theoretical Si Req'd (g/m²) | Actual Si Used (g/m²) | Weight of Filler Metal g | Weight of Filler Metal % Theoretical |
|---|---|---|---|---|---|---|
| AA6061 | AA1050 | .01 | 3.4 | 4.1 | .0113 | 28.3 |
| | | .02 | 5.4 | 5.2 | — | — |
| | | .03 | 6.8 | 6.0 | — | — |
| | | .05 | 13.6 | 11.6 | .0346 | 30.7 |
| | | .08 | 20.5 | 22.5 | .1044 | 47.7 |
| | | .10 | 27.3 | 24.4 | .1352 | 56.6 |
| AA3033 | AA4045 | .05 | — | — | .1327 | 54.3 |

EXAMPLE 8

This test was conducted to determine the joining characteristics of AA1050 clad on AA6061 core. The coating procedure used with Example 7 was repeated using approximately similar coating weights. Two 38 mm long×3.2 mm wide AA1100 alloy strips were formed into angles for T joint joining to coated 25×76 mm composite sheet. A AA4045/3003 braze sheet flux coated with Nocolok ® was assembled with similar T joint configuration, and was run concurrently as a reference. After furnace brazing the length of joining and fillet size were evaluated. The results obtained are shown in Table 8. It was found that acceptable fillets of satisfactory size were obtained with clad thicknesses of 0.08 mm and greater and Si coatings of 13.3 g/m² or greater.

TABLE 8

| Core Alloy | Clad Alloy | Clad Thickness (mm) | Si Coating (g/m²) | Length of Joining (mm) | Fillet Size |
|---|---|---|---|---|---|
| AA6061 | AA1050 | .01 | 3.9 | — | — |
| | | .02 | 5.3 | — | — |
| | | .03 | 6.6 | 38 | Very Small |
| | | .05 | 13.3 | 38 | Small |
| | | .08 | 19.7 | 38 | Moderate |
| | | .10 | 27.0 | 38 | Large |
| AA3033 | AA4045 | .05 | — | 38 | Moderate |

We claim:

1. An aluminum alloy composite sheet containing magnesium and suitable for use in brazing comprising: (a) an aluminum alloy core sheet, (b) a clad layer on at least one face of said core sheet, said clad layer being a sheet of aluminum or aluminum alloy other than a brazing alloy and (c) a coating on said clad layer comprising a mixture of brazing flux material and metal particles capable of forming in situ a eutectic alloy with aluminum and the magnesium being present such that it provides an amount of less than 0.1 % by weight magnesium at the point of brazing at the time of brazing.

2. An aluminum alloy composite sheet containing magnesium and suitable for use in brazing comprising: (a) an aluminum alloy core sheet, (b) a clad layer on at least one face of said core sheet, said clad layer being a sheet of aluminum or aluminum alloy other than a brazing alloy and (c) a coating on said clad layer comprising a mixture of brazing flux material and metal particles capable of forming in situ a eutectic alloy with aluminum and the magnesium being present such that the metal present at the physical point of filler metal generation resulting from the reaction of the metal particles capable of forming a eutectic alloy with the metal of the cladding at the time of the brazing has a magnesium content of less than 0.1% by weight.

3. A composite sheet as claimed in claim 2 wherein the core sheet is formed of an aluminum alloy containing magnesium.

4. A composite sheet as claimed in claim 2 wherein the metal particles are particles of Si, Cu or Ge.

5. A composite sheet as claimed in claim 4 wherein the coating contains silicon and flux in the ratio of silicon:flux in the range of 0.1:1 to 5:1.

6. A composite sheet as claimed in claim 1 wherein the flux is a composition containing by weight: 20 to 45% potassium, 10 to 25% aluminum and 45 to 60% fluorine.

7. A composite sheet as claimed in claim 1 wherein the flux is a composition containing by weight: 40 to 70% $AlF_3$ and 30 to 60% KF.

8. A composite sheet as claimed in claim 5 wherein the flux is a potassium fluoroaluminate.

9. A composite sheet as claimed in claim 5 wherein the silicon particles have sizes in the range of 4 to 80 μm.

10. A composite sheet as claimed in claim 9 wherein the silicon particles have sizes in the range of about 5-50 μm.

11. A composite sheet as claimed in claim 10 wherein the coating is applied in an amount of 10 to 130 $g/m^2$.

12. A composite sheet as claimed in claim 9 wherein the coating mixture also contains additional metal particles of generally the same particle size distribution as the eutectic alloy forming metal particles, said additional metal particles being adapted to modify the properties of the brazed product.

13. A composite sheet as claimed in claim 12 wherein the additional metal particles are copper particles adapted to enhance the mechanical strength of the brazed product.

14. A composite sheet as claimed in claim 12 wherein the additional metal particles are selected from Fe, Mn, Ni, Cu, excess Si and Zn powders to provide enhanced mechanical strength, elevated temperature strength and heat treatability to the brazed product.

15. A composite sheet as claimed in claim 12 wherein the additional metal particles are selected from Cu, Zn, Ni, Co and Mn powders to provide enhanced formability properties.

* * * * *